United States Patent [19]
Åkerlind

[11] Patent Number: 5,994,677
[45] Date of Patent: Nov. 30, 1999

[54] VESSEL FOR PREPARATION OR COOKING OF E.G. FOOD-STUFFS AND BEVERAGES BY HEATING

[75] Inventor: Jan Åkerlind, Stockholm, Sweden

[73] Assignee: CD Food Technology AB, Stockholm, Sweden

[21] Appl. No.: 08/894,357

[22] PCT Filed: Feb. 26, 1996

[86] PCT No.: PCT/SE96/00224

§ 371 Date: Aug. 18, 1997

§ 102(e) Date: Aug. 18, 1997

[87] PCT Pub. No.: WO96/27122

PCT Pub. Date: Sep. 6, 1996

[30] Foreign Application Priority Data

Feb. 28, 1995 [SE] Sweden .................................. 9500738

[51] Int. Cl.[6] .................................................. H05B 6/68
[52] U.S. Cl. ......................... 219/502; 219/705; 219/710; 219/714; 116/216; 374/149; 99/451; 426/88
[58] Field of Search .................................... 219/710, 711, 219/714, 506, 494, 502, 720, 705; 116/216; 374/149, 150; 99/325, DIG. 14, 451; 426/88

[56] References Cited

U.S. PATENT DOCUMENTS

| 4,180,722 | 12/1979 | Clewans . | |
|---|---|---|---|
| 4,816,634 | 3/1989 | Lentz et al. | 219/710 |
| 4,839,485 | 6/1989 | Koch et al. | 219/714 |
| 4,933,525 | 6/1990 | St. Phillips . | |
| 5,011,042 | 4/1991 | Bunce et al. | 219/714 |
| 5,153,036 | 10/1992 | Sugisawa et al. | 426/88 |
| 5,310,261 | 5/1994 | Blue et al. . | |
| 5,321,232 | 6/1994 | Ogle . | |
| 5,426,280 | 6/1995 | Smith | 219/506 |
| 5,504,311 | 4/1996 | DuBuis et al. | 219/714 |

FOREIGN PATENT DOCUMENTS

| 38 36 424 | 7/1989 | Germany . | |
|---|---|---|---|
| 58-193028 | 6/1982 | Japan | 219/714 |
| 6-94244 | 4/1994 | Japan . | |
| 2 217 557 | 10/1989 | United Kingdom . | |

*Primary Examiner*—Philip H. Leung
*Attorney, Agent, or Firm*—Young & Thompson

[57] ABSTRACT

A method for controlling a heating procedure in an oven by using an optically readable information carrier with or on the heating object. The oven may be provided with an optical reading device for touchless reading of the information carrier before and/or during the heating. By providing the information carrier with one or more fields that exhibit color shift at temperatures at will, a feed-back control of the procedure is made possible with simple technical solutions. The special feature of the method is the use of an additional information field for control of the start of the oven.

11 Claims, 1 Drawing Sheet

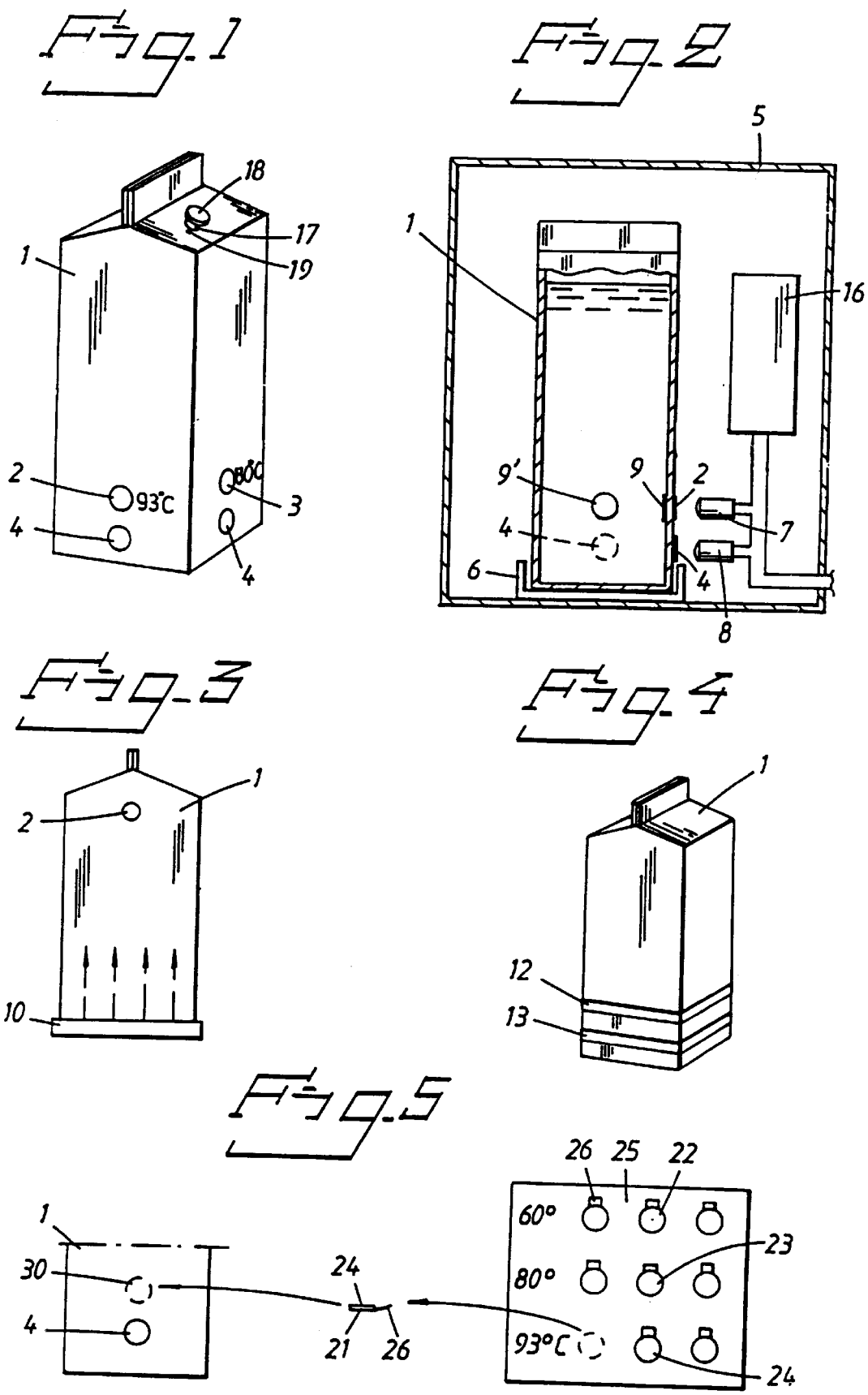

VESSEL FOR PREPARATION OR COOKING OF E.G. FOOD-STUFFS AND BEVERAGES BY HEATING

FIELD OF THE INVENTION

The present invention relates to a vessel, particularly to a vessel having walls of a material which permits heating of the content of the vesssel by radiation, in particular microwave radiation.

BACKGROUND OF THE INVENTION

Such vessels, and the term vessel is used here to include also packages and containers of different kinds which normally, at least partially, have walls of a material which depends on the actual kind of heating. If the heating takes place by heat radiation of the type infrared heat radiation from e.g. a cooking plate, the material may be metal, at least in the bottom. If the heating takes place by means of the nowadays very common heating type using micro-waves, then the material may be cardboard or plastics or the like. Below, to facilitate, such vessels, along with the instant content in each case, will sometimes be referred to as "object".

Common to all types of heating is the problem of accurately controlling the temperature, e.g. to prevent that the temperature is insufficient for the application in question or to prevent that the vessel as used bursts up and starts leaking due to too a high internal pressure within the vessel, which may happen if the temperature has unintentionally become too high.

To achieve such a temperature control it is known to provide the vessel with an information carrier having one or more optically readable control information fields which information carrier is adapted to be used in order to indicate the temperature of the object as the object is heated in an oven.

Here, it is conceivable, for instance, to watch visually how the information carrier shifts color as the desired temperature has been reached, so that the heating procedure may be stopped then. However, the information carrier is preferably adapted to cooperate with an optical reading device of the oven and a control device to control the heating procedure at least partially in dependence of the read temperature information. It is preferred that the information carrier is arranged directly on the heating object, e.g. as a disposable label or, alternatively, as a device for repeated use, which device is applied on the object, its vessel, package or contaner, e.g. as the heating is performed.

The information carrier may comprise a field of temperature sensitive color which exhibits a color shift at the desired end temperature of the object, preferably the ready-temperature of a food-stuff or a beverage.

It is conceivable that the information carrier has the shape of a label or a device for use in an oven having a lighting within the oven cavity, in which case the information carrier preferably is characterized in that the field with temperature sensitive color is composed of two layers, namely an uppermost layer, which shifts from transparent into non-transparent, or vice versa, at a color shift, and a lowermost layer, which exhibits fluorescense at activation by the oven cavity lighting.

SUMMARY OF THE INVENTION

Prior to describing the invention in more details with reference to the figures in the drawing it might be worthwhile to make some general remarks with respect to the invention, namely that the invention generally is based on the concept that it is possible to utilize optical reading for the provision of a control system for an oven, which is partially associated with the oven itself, and the technical establishment thereof, and which is partially associated with the object or the foodstuff which should be subjected to heating/preparation, and, further, the realization that such a system, particularly the case with feed-back control, which in known ovens is solely associated with the technical establishment of the oven, may achieve considerable simplifications in the design of the control system of the oven and the general operation of the oven, and that this may be achieved while utilizing cost efficient technical solutions that are known per se by those skilled in the art. There exists no principal limit for how much control information may be taken from the information carrier. Just as well as the information carrier may hold information for choice of a pre-set program with the control unit of the oven, the information carrier itself may comprise the control program, which is then read into the control unit at the actual use. In the present case the term optical reading is used, e.g. reading while using light wavelengths within the optical range, but also other wavelengths may be possible. Thus, the information carrier may comprise fields with crystalline or similar substances which at activation by scanning radiation my be cauesd to emit their information by discrete wavelengths or within defined wave length ranges. A feedback control may be achieved in that these substances are adapted to emit radiation of a temperature dependent wavelength.

An important requirement by heating as set forth above is that the system operates reliably and only for packages of a predetermined kind. This is achieved according to the invention in that the vessel is provided with a further characterizing feature in the shape of an additional, temperature non-sensitive color marking which is disposed in such a manner that it can be detected by a further detecting device, adapted to control the start of the heating procedure. Only vessels having a marking that controls the stop of the heating are provided with the additional color marking, which results in that if a vessel that lacks both kinds of markings is inserted into e.g. a microwave oven having an indicator for stopping of the heating then no heating can be started. In this way it is prevented that a heating is started that cannot be automatically interrupted at the desired temperature.

This additional, temperature non-sensitive color marking is preferably black, whereby interfering reflections may be largely avoided on detecting by means of light within the infrared vawelength range.

The temperature sensitive color can be applied by painting or by printing the color directly on at least one of the walls of the vessel. As the temperature sensitive color may contain liquid crystals and may be difficult to apply by printing procedures it may be advantageous to have the color applied to a base having a self-adhering glue on one side thereof, by means of which the color marking may be affixed to at least one of the walls of the vessel. If the vessel has a plastic covered surface then the marking may be detached after use in order to be used repeatedly. Such color markings, having different temperature definitions, may be stored on a storage sheet and may be moved to and from a vessel as desired.

Tests have verified that the temperature of the content of the vessel is only slightly higher than the temperature of the outer surface of the vessel. Only at temperature higher than about 65° C. and up to 95° C. will the temperature of the surface be about 5° C. lower. It is possible to compensate for this by the manufacture of the color markings, e.g. by disposing the color markings interiorly of a vessel made wholly or partly of a transparent material, so that the color marking is visible from the outer side.

BRIEF DESCRIPTION OF THE DRAWINGS

The invention is disclosed in more details below with reference had to the accompanying drawings which schematically show various examples of vessels according to the invention and wherein FIG. 1 is a perspective view of a vessel according to a first embodiment, used as an example, FIG. 2 is a side elevation of a vessel according to a second example, disposed in a microwave oven, FIG. 3 is a side elevation of a vessel according to a third embodiment disposed on a heating plate, FIG. 4 is a perspective view of a vessel acording to a further embodiment, and FIG. 5 is view of a chart of color markings and a partial view of a vessel having a marking for disposition of color marks.

DETAILED DESCRIPTION OF THE INVENTION

FIG. 1 shows a vessel of conventional type, containing water and a capsule with instant coffee powder (not shown). The content of the capsule should be heated up to 93° C. in order for the capsule to open, and, thus, in order for the coffee so produced to have the correct serving temperature. Therefore, the container is provided with a temperature sensitive color marking 2 which shifts color at a temperature of the outer surface of the vessel that corresponds to a temperature of 93° C. of the coffee within the vessel with an ordinary performed cooking, which has to be determined from case to case. On an adjacent side the container is provided with another temperature-sensitive color marking 3 which shifts its color at a temperature of 80° C. of the content of the container. Further, the container 1 is provided with a color mark 4 which denotes that the container is intended to be used for heating in a microwave oven having automatic means for control of the heating up to the desired temperature.

Such an oven 5 is shown schematically in FIG. 2. A container 1 of the kind as shown in FIG. 1, although made from a transparent material and having a color marking 9 disposed internally of the container, is placed in the oven in a guide 6 for the lowermost part of the container with the color marking 2 facing a sensing device 7. Simultaneously, the color mark 4 is positioned opposite a second sensing device 8. When the oven is switched on the sensing device 8 senses the existence of the color mark 4 and activates a relay or the like so that the oven starts the heating. Within a few minutes the content of the container has reached the desired 93° C. and the color mark 2 shifts color which is sensed by the sensing device 7 which interrupts the heating through a relay or the like (not shown). In case a heating to only 80° C. had been desired then the container should have been placed in the oven with the color mark 3 facing the sensing device 7.

The design of the oven 5 and of the devices 7 and 8 do not form a part of the invention, and therefore they are not described in more details here.

Sometimes, particularly with containers that may be opened and resealed, it is desirable to determine the heating temperature from case to case. It is then possible to use self-adhering color markings that are applied to the container in question. Such color markings on a carrier 21 of self-adhering plastics are shown in FIG. 5 and are denoted 22, 23 and 24 for the temperatures 60° C., 80° C. and 93° C., respectively, and are affixed to a chart 25. To facilitate detaching the carriers 21 are provided with a flap 26, that is non-adhering and on which the temperature values are preferably printed. One such color marking is adapted to be affixed to a container which is provided with a an indication 30 where the color marks 22, 23 or 24 are to be placed in order to get a correct position within the microwave oven. If desired, the color markings may be detached from the container 1 after use, and again affixed to the chart 25 for repeated use a number of times.

I claim:

1. A food container for positioning in a cavity of an oven for heating food in the container, comprising a wall, an information carrier provided on said wall, at least one optically readable temperature sensitive color marking carried by said information carrier and capable of shifting color when the food is heated to a desired final temperature, said optically readable temperature sensitive color marking for cooperating with an optical reading device of the oven, when the container is positioned in a predetermined orientation in the oven cavity, and a temperature insensitive color marking capable of generally eliminating interfering light reflections within the infrared wavelength range, and positioned on said wall in a predetermined relationship with said temperature sensitive color marking for cooperating with a detecting device of the oven, said detecting device being adapted to initiate the heating of the food in the container, when the container is positioned in said predetermined orientation in the oven cavity.

2. A container as claimed in claim 1, wherein at least a portion of said wall is transparent, and said optically readable temperature sensitive color marking is positioned on said portion of said wall inside the container, whereby said optically readable temperature sensitive color marking is optically readable from outside the container.

3. A container as claimed in claim 1, further comprising a plurality of further optically readable temperature sensitive color markings provided on said wall and capable of shifting color at different temperatures.

4. A container as claimed in claim 1, wherein said temperature insensitive color marking is black.

5. A container as claimed in claim 1, wherein said optically readable temperature sensitive color marking exhibits fluorescence in color when exposed to light in the cavity of the oven, and said information carrier comprises a transparent layer, which is shiftable into a non-transparent state, when the food is heated to said desired final temperature, and covers said optically readable temperature sensitive color marking.

6. A system for heating food, comprising:

a container with food to be heated and having a wall;

an information carrier provided on said wall;

at least one optically readable temperature sensitive color marking carried by said information carrier and capable of shifting color when the food is heated to a desired final temperature;

a temperature insensitive color marking capable of generally eliminating interfering light reflections within the infrared wavelength range, and positioned on said wall in a predetermined relationship with said temperature sensitive color marking;

an oven having a cavity in which said container fits;

a reading device in said cavity for reading said optically readable temperature sensitive color marking of said container, when the container is positioned in a predetermined orientation in said cavity;

a detecting device in said cavity for detecting said temperature insensitive color marking of said container, when the container is positioned in said predetermined orientation in said cavity; and a control device for controlling said oven to initiate the heating of the food in said container in response to said detecting device detecting the presence of said temperature insensitive color marking of said container.

7. A system as claimed in claim 6, wherein said control device controls said oven to terminate the heating of the food in said container in response to said reading device reading a shift in color of said optically readable temperature sensitive color marking of said container.

8. A system as claimed in claim 6, wherein at least a portion of said wall is transparent, and said optically readable temperature sensitive color marking is positioned on said portion of said wall inside the container, whereby said optically readable temperature sensitive color marking is optically readable from outside said container.

9. A system as claimed in claim 6, further comprising a plurality of further optically readable temperature sensitive color markings provided on said wall and capable of shifting color at different temperatures.

10. A system as claimed in claim 6, wherein said temperature insensitive color marking is black.

11. A system as claimed in claim 6, wherein said optically readable temperature sensitive color marking exhibits fluorescence in color when exposed to light in said cavity of said oven, and said information carrier comprises a transparent layer, which is shiftable into a non-transparent state, when the food is heated to said desired final temperature, and covers said optically readable temperature sensitive color marking.

* * * * *